United States Patent
Adderly et al.

(10) Patent No.: US 10,230,776 B2
(45) Date of Patent: *Mar. 12, 2019

(54) MANAGING ACCESS TO A CONFERENCE CALL

(71) Applicant: International Business Machines Corporation, Armonk, NY (US)

(72) Inventors: Darryl M. Adderly, Morrisville, NC (US); Prasad Kashyap, Apex, NC (US); Brian J. Murray, Raleigh, NC (US); Wenjian Qiao, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,590

(22) Filed: Oct. 19, 2017

(65) Prior Publication Data

US 2018/0048684 A1 Feb. 15, 2018

Related U.S. Application Data (63) Continuation of application No. 15/347,412, filed on Nov. 9, 2016, now Pat. No. 9,832,240, which is a (Continued)

(51) Int. Cl.
*H04M 1/00* (2006.01)
*H04M 3/38* (2006.01)
(Continued)

(52) U.S. Cl.
CPC ........ *H04L 65/403* (2013.01); *H04L 12/1822* (2013.01); *H04L 51/046* (2013.01); *H04L 65/1093* (2013.01); *H04L 65/4038* (2013.01);
*H04M 1/00* (2013.01); *H04M 1/72566* (2013.01); *H04M 3/382* (2013.01); *H04M 3/563* (2013.01); *H04M 3/565* (2013.01);
(Continued)

(58) Field of Classification Search
CPC . H04L 65/403; H04L 12/1822; H04L 51/046; H04L 65/1093; H04L 65/4038; H04M 1/00; H04M 3/382; H04M 3/563; H04M 3/565; H04M 2203/2072; H04W 4/06
USPC .................................................... 379/202.01
See application file for complete search history.

(56) References Cited

U.S. PATENT DOCUMENTS 8,243,901 B2   8/2012   Bostick
8,364,133 B1   1/2013   Lucey
(Continued)

OTHER PUBLICATIONS

List of IBM Patents or Patent Applications Treated as Related; Oct. 19, 2017; pp. 1-2.

*Primary Examiner* — Quynh H Nguyen
(74) *Attorney, Agent, or Firm* — Fabian VanCott; Steven L. Nichols (57) ABSTRACT

Managing access to a conference call includes obtaining, via a calendar application, a list of participants, the list of participants includes a number of participants to be included in a conference call, identifying, from the list of participants, a first portion of the participants that have personal passcodes, generating guest passcodes for a second portion of the participants associated with the list of participants that do not have the personal passcodes, and permitting, based on the personal passcodes or the guest passcodes, each of the participants to participate in the conference call.

20 Claims, 5 Drawing Sheets

Related U.S. Application Data continuation of application No. 14/734,386, filed on Jun. 9, 2015, now Pat. No. 9,614,968.

(51) Int. Cl.
| | | |
|---|---|---|
| *H04M 3/56* | (2006.01) | |
| *H04W 4/06* | (2009.01) | |
| *H04L 12/18* | (2006.01) | |
| *H04L 12/58* | (2006.01) | |
| *H04L 29/06* | (2006.01) | |
| *H04M 1/725* | (2006.01) | |

(52) U.S. Cl.
CPC ...... *H04W 4/06* (2013.01); *H04M 2203/2072* (2013.01); *H04M 2250/62* (2013.01)

(56) References Cited

U.S. PATENT DOCUMENTS

| | | |
|---|---|---|
| 8,819,129 B1 | 8/2014 | Cyriac |
| 2004/0028200 A1 | 2/2004 | Carlson |
| 2008/0013706 A1 | 1/2008 | Kelley et al. |
| 2008/0069328 A1 | 3/2008 | Bostick et al. |
| 2009/0327425 A1 | 12/2009 | Gudipaty |
| 2011/0075826 A1 | 3/2011 | Block |
| 2012/0207296 A1 | 8/2012 | George et al. |
| 2013/0108034 A1 | 5/2013 | Colbert |
| 2013/0130666 A1 | 5/2013 | Dunko |
| 2013/0144952 A1 | 6/2013 | Lucey et al. |
| 2014/0323085 A1 | 10/2014 | Wu |
| 2015/0244522 A1 | 8/2015 | Cheruvath et al. |

Fig. 6

MANAGING ACCESS TO A CONFERENCE CALL

BACKGROUND

The present invention relates to managing access to a conference call, and more specifically, to managing access to a conference call for a number of participants.

A conference call is an audio based discussion between a number of participants. The participants may be joined together via telephone devices to facilitate the conference call. The conference call may be designed to allow the participants to participate during the conference call by allowing each of the participants to listen and contribute to the conference call. Further, the conference call may be designed to allow a select number of the participants to listen to the conference call, but not contribute to the conference call.

SUMMARY

A method for managing access to a conference call includes obtaining, via a calendar application, a list of participants, the list of participants includes a number of participants to be included in a conference call, identifying, from the list of participants, a first portion of the participants that have personal passcodes, generating guest passcodes for a second portion of the participants associated with the list of participants that do not have the personal passcodes, and permitting, based on the personal passcodes or the guest passcodes, each of the participants to participate in the conference call.

A system for managing access to a conference call includes a registering engine to register, via a user interface (UT), a number of users with a managing system, the managing system permitting the number of users to create a list of participants in a calendar application for a conference call, an obtaining engine to obtain, via the calendar application, the list of participants, the list of participants includes a number of participants to be included in the conference call, a participant identifying engine to identify, from the list of participants, a first portion of the participants that have personal passcodes, a generating engine to generate guest passcodes for a second portion of the participants associated with the list of participants that do not have the personal passcodes, a permitting engine to permit, based on the personal passcodes or the guest passcodes, each of the participants to participate in the conference call, a moderator identifying engine to identify, based on the personal passcodes, a moderator for the conference call, and a receiving engine to receive an action from at least one of the participants.

A machine-readable storage medium encoded with instructions for managing access to a conference call, the instructions executable by a processor of a system to cause the system to identify, from a list of participants, a first portion of participants that have personal passcodes, generate guest passcodes for a second portion of the participants associated with the list of participants that do not have the personal passcodes, and permit, based on the personal passcodes or the guest passcodes, each of the participants to participate in the conference call.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for managing access to a conference call, such that each participant has a personal passcode that is specific to them and can be reused by the participant for different conference calls regardless of who is attending or moderating each conference call.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a conference call is an audio based discussion between a number of participants. A moderator of a conference call sets up the conference call and shares a conference call number and a participant passcode with each participant that is to be included in the conference call. To join the conference call, each participant uses a keypad on a telephone device to dial the conference call number given to them by the moderator. The participant then uses the keypad on the telephone device to enter in the participant passcode given to them by the moderator. Once the participant passcode is entered in correctly, the participant is then joined to the conference call.

However, once a participant passcode has been shared, it must be changed for future conference calls to prevent other participants from attending conference calls they are not authorized to attend. Such intrusions happen inadvertently when the conference call has been rescheduled, when the conference call is extended, or when participants join the conference call a few minutes earlier then the scheduled time for the conference call. Further, if there is an additional participant that is to join the conference call, there is no way for the moderator to know who the additional participant is since all the participants have the same participant passcode. Further, each of the participants must recall or look up the participant code for each conference call. This may be burdensome for each of the participants since the participant code varies between moderators. As a result, the participants need to be able to look up the participant passcode or memorize the participant passcode for each specific conference call. This can be challenging if the participants cannot look up the participant passcode or cannot recall the participant passcode.

The principles described herein include a method for managing access to a conference call. Such a method includes obtaining, via a calendar application, a list of participants, the list of participants includes a number of participants to be included in a conference call, identifying, from the list of participants, a first portion of the participants that have personal passcodes, generating guest passcodes for a second portion of the participants associated with the list of participants that do not have the personal passcodes, and permitting, based on the personal passcodes or the guest passcodes, each of the participants to participate in the conference call. Such a method allows each participant to have a personal passcode or a guest passcode that is specific to that participant. As a result, the system is aware, via manual set-up or via communication with the calendar application, which participants are permitted each conference call.

In the present specification and in the appended claims, the term "list of participants" means a number of participants that are to participate in a specific conference call. The list of participants may include participants that have personal passcodes and/or guest passcodes.

In the present specification and in the appended claims, the term "calendar application" means a web based application that is used for scheduling conference calls. The calendar application allows a moderator to schedule the conference call at a specific time and date. Further, the calendar application allows a moderator to add participants to the conference call via a list of participants.

In the present specification and in the appended claims, the term "conference call" means communication between a number of participants over a network. The conference call may be an audio conference call. The conference call may be a video conference call.

In the present specification and in the appended claims, the term "participants" means a number of users that are to be included in a conference call. Participants include users that have been invited to the conference call by a moderator.

In the present specification and in the appended claims, the term "personal passcode" means an identification number that is registered and specific to a user such as a participant. To join a conference call the user may specify their personal passcode via a keypad of a telephone device.

In the present specification and in the appended claims, the term "guest passcode" means an identification number that is temporarily registered to a guest. To join a conference call the guest may specify their guest passcode via a keypad of a telephone device. There may be a guest passcode for each guest associated with a conference call.

In the present specification and in the appended claims, the term "moderator" means a user sets up a conference call. The moderator may set up a conference call by selecting a time, a date, and participants for the conference call.

In the present specification and in the appended claims, the term "action" means a sequence of keys a participant may enter in on a keypad of a telephone device. The sequence of keys may be predefined by a managing system. For example, an action such as *3 always indicates that the conference call will be an impromptu conference call. As a result, an action may be generic for all participants. The sequence of keys may be specific to a participant. For example, one participant may specify that an action such as *5 indicates that the conference call will be an impromptu conference call for while another participant may specify that an action such as *9 indicates that the conference call will be an impromptu conference call. As a result, an action may be specific to a single participant or generic for all of the participants.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
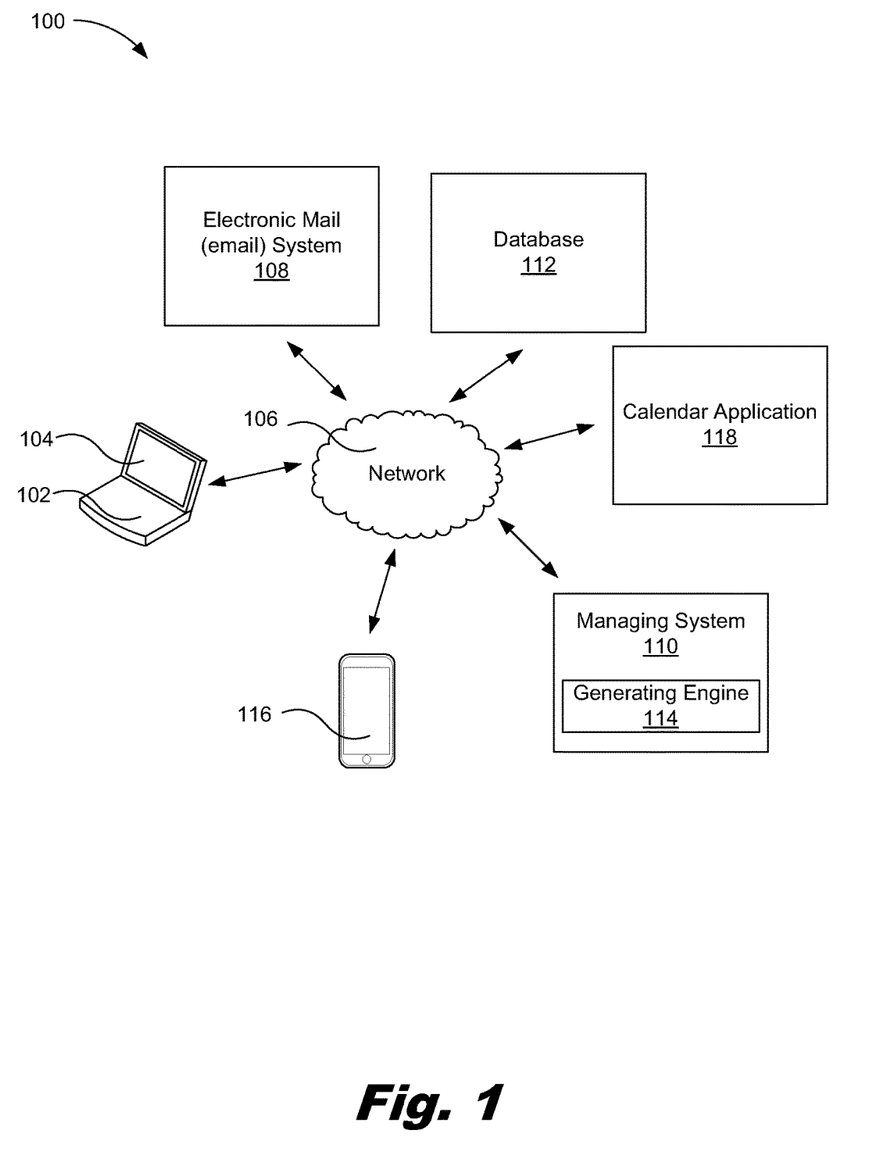
FIG. 1 is a diagram of an example of a system for managing access to a conference call, according to one example of principles described herein.

Referring now to the figures, FIG. 1 is a diagram of an example of a system for managing access to a conference call, according to one example of principles described herein. As will be described below, a managing system is in communication with a network to obtain, via a calendar application, a list of participants, the list of participants includes a number of participants to be included in a conference call. The managing system identifies, from the list of participants, a first portion of the participants that have personal passcodes. Further, the managing system generates guest passcodes for a second portion of the participants associated with the list of participants that do not have the personal passcodes. The managing system permits, based on the personal passcodes or the guest passcodes, each of the participants to participate in the conference call.

As illustrated, the system (100) includes a user device (102) with a display (104). Users, such as moderators or participants, use the user device (102) to access a network (106). As will be described in other parts of this specification, the user device (102) allows the users to register with a managing system (110).

The system (100) further includes an electronic mail (email) system (108). The email system (108) may include a number of email addresses associated with the users. Further, guest passcodes may be sent to the email system (108). As a result, a user, such as a participant that is a guest, may retrieve a guest passcode by accessing the email system (108).

Further, the system (100) includes a database (112). As will be described in other parts of this specification, the database (112) may store user names, email address, and personal passcodes for each of the users that have registered with the managing system (110).

The system (100) further includes a calendar application (118). The calendar application (118) may be a web based application that is used for scheduling conference calls. The calendar application (118) allows a moderator to schedule a conference call at a specific time and date. Further, the calendar application (118) allows the moderator to add participants to the conference call via the list of participants.

Further, the system (100) includes telephone device (116). As will be described in other parts of this specification to join the conference call, a user, such as a moderator or participant, uses a keypad on the telephone device (116) to dial a conference call number. The conference call number may be given to each participant by the moderator. The conference call number may be a single phone number that all participants dial in to.

The system (100) further includes a managing system (110). The managing system (110) may be in communication with the email system (108), the database (112), the calendar application (118), the user device (102), and a telephone device (116) over a network (106).

The managing system (110) obtains, via the calendar application (118), a list of participants, the list of participants includes a number of participants to be included in a conference call. The conference call may be a planned conference call, an impromptu conference call, or an extended conference call.

Further, the managing system (110) identifies, from the list of participants, a first portion of the participants that have personal passcodes. The managing system (110) may access the database (112) to determine which of the participants have personal passcodes.

A generating engine (114) of the managing system (110) generates guest passcodes for a second portion of the participants associated with the list of participants that do not have the personal passcodes. The managing system (110) may access the database (112) to determine which of the participants do not have personal passcodes.

Further, the managing system (110) permits, based on the personal passcodes or the guest passcodes, each of the participants to participate in the conference call. Once, the participant has dialed the conference call number, the participant then uses the keypad on the telephone device (116) to enter in a personal passcode or a guest passcode. Once the personal passcode or a guest passcode is entered in correctly, the managing system (110) contacts the calendar application (118) to determine which conference call the participant is to join and joins the participant to the appropriate conference call. Such a system allows each participant to have a personal passcode that is specific to that participant. Especially if group sharing of a guest passcode is not permitted. As a result the managing system (110) is aware, via communication with the calendar application (118), which participants are permitted to each conference call. More information about the managing system (110) will be described later on in this specification.

While this example has been described with reference to the managing system being located over the network, the managing system may be located in any appropriate location according to the principles described herein. For example, the managing system may be located in a user device, a server, a datacenter, other locations, or combinations thereof.

Figure 2:
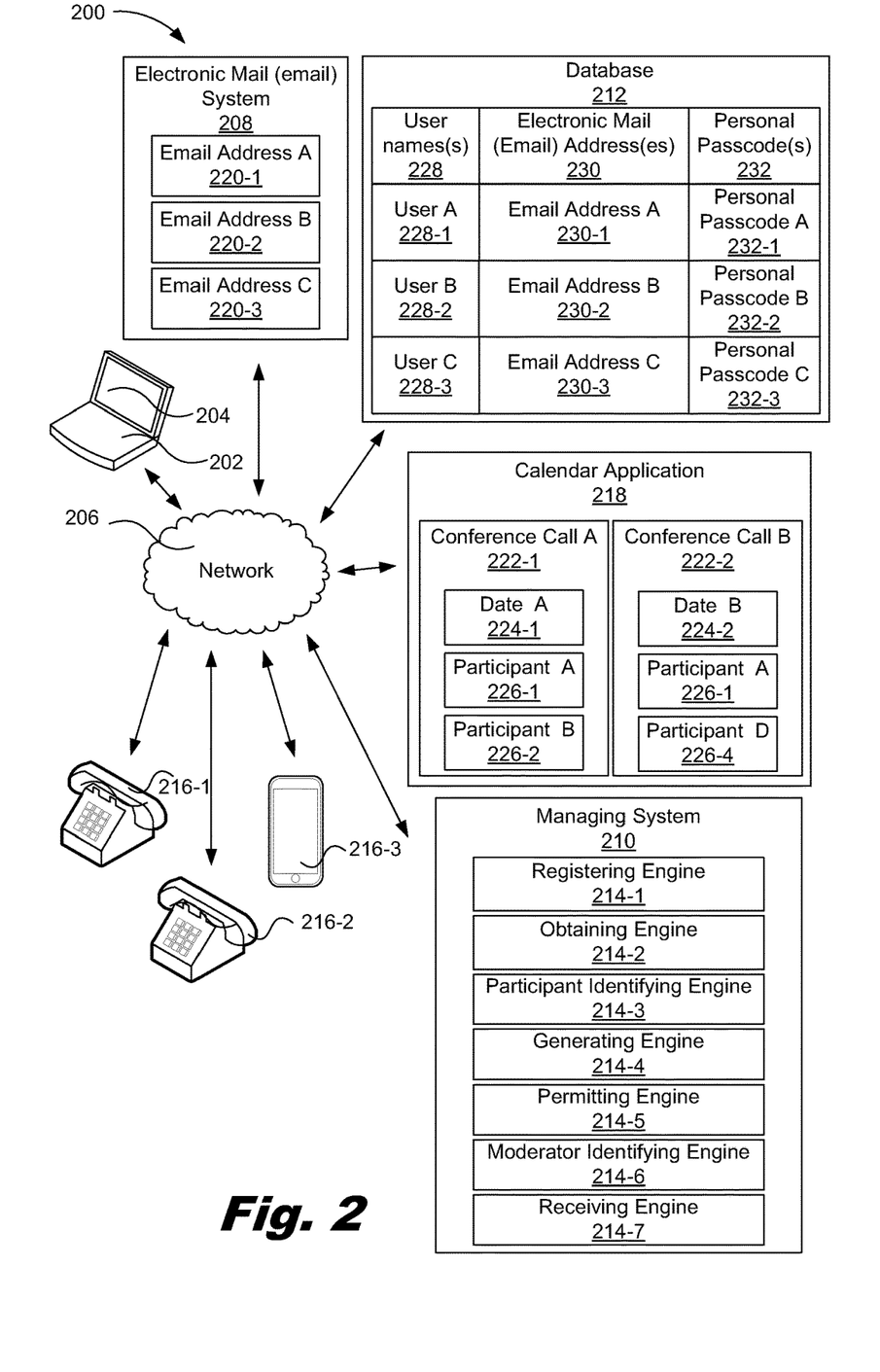
FIG. 2 is a diagram of an example of a system for managing access to a conference call, according to one example of principles described herein.

FIG. 2 is a diagram of an example of a system for managing access to a conference call, according to one example of principles described herein. As will be described below, a managing system is in communication with a network to obtain, via a calendar application, a list of participants the list of participants includes a number of participants to be included in a conference call. The managing system identifies, from the list of participants, a first portion of the participants that have personal passcodes. Further, the managing system generates guest passcodes for a second portion of the participants associated with the list of participants that do not have the personal passcodes. The managing system permits, based on the personal passcodes or the guest passcodes, each of the participants to participate in the conference call.

As illustrated, the system (200) includes a user device (202) with a display (204). In one example, a user uses the user device (202) to access a network (206). The user device (202) allows a number of users to register with a managing system (210). For example, a user interface (UI) may be presented to the user. As will be described below, the UI may include text boxes, drop down boxes, and radio buttons. The text boxes, drop down boxes, and radio buttons allow the users to specify user names and email addresses.

The system (200) further includes an email system (208). The email system (208) may store in memory a number of email addresses associated with the users. As illustrated the email system (208) stores in memory email address A (220-1), email address B (220-2), and email address C (220-3). Each of the email addresses may correspond to a user. For example, email address A (220-1) may correspond to a user A. Email address 13 (220-2) may correspond to a user B. Email address C (220-3) may correspond to a user C. In some examples, a managing system (210) may be in communication with the email system (208) to retrieve and associate email addresses with personal passcodes for users.

Further, the system (200) includes a database (212). Once the users register with the managing system (210), information about the user may be stored in the database (212). As illustrated, the database (112) may store user names (228), email address (230), and personal passcodes (232) for each of the users. For example, the database (212) stores user names (228) such as user A (228-1), user B (228-2), and user C (228-3).

The database (212) may store email addresses (230) that are associated with each of the user names (228). For example, the database (212) may store email address A (230-1). Email address A (230-1) may be associated with user A (228-1). The database (212) may store email address B (230-2). Email address B (230-2) may be associated with user B (228-2). Further, the database (212) may store email address C (230-3). Email address C (230-3) may be associated with user C (228-3).

Further, the database (212) may store personal passcodes (232) that are associated with each of the user names (228). For example, personal passcode A (232-1) may be associated with user A (228-1). Personal passcode B (232-2) may be associated with user B (228-2). Personal passcode C (232-3) may be associated with user C (228-3). The personal passcodes (232) may be generated by a managing system (210) and assigned to a user name (228) and/or email address (230).

The system (200) further includes a calendar application (218). The calendar application (218) may be a web based application that is used for scheduling conference calls. The calendar application allows a moderator to schedule the conference call at a specific time and date. Further, the calendar application allows a moderator to add participants to the conference call via the list of participants. As illustrated, the calendar application (218) includes conference call A (222-1) and conference call B (222-2). Each of the conference calls (222) may be scheduled for a specific date. For example, date A (224-1) may specify that conference call A (222-1) is scheduled for Friday April $10^{th}$ at 9:00 AM. Date B (224-4) may specify that conference call B (222-2) is scheduled for Friday April $10^{th}$ at 10:00 AM.

Further, the calendar application (218) may include a list of participants for each of the conference calls (222-1). The list of participants for conference call A (222-1) may include participant A (226-1) and participant B (226-2). As will be described below, participant A (226-1) may be user A (228-1) and participant B (226-2) may be user B (228-2). Similarly, the list of participants for conference call B (222-2) may include participant A (226-1) and participant D (226-4). As will be described below, participant A (226-1) may be user A (228-1) and participant D (226-4) may be a guest that has not registered with the managing system (210).

The system (200) further includes a number of telephone devices (216). The telephone devices (216) may be landline telephones, smart phones, cellular phones, other types of telephones that can facilitate a conference call. As illustrated, the number of telephone devices (216) includes a telephone device A (216-1), telephone device B (216-2), telephone device C (216-3). Further, to join the conference call, a user, such as a moderator or participant, uses a keypad on a telephone device (216) to dial a conference call number. The user then uses the keypad on the telephone device (216) to enter in a personal passcode or a nest passcode. Once the personal passcode or a guest passcode is entered in correctly, the user is then joined to an appropriate conference call as described in FIG. 1.

Although each of the telephone devices (216-1) need not be associated with a user, for illustrative purposes each of the telephone devices may be used and/or associated with one user. For example, telephone device A (216-1) may be used and/or associated with user A (228-1). Telephone device B (216-2) may be used and/or associated with user B (228-2). Telephone device C (216-3) may be used and/or associated with user D (228-4).

The system (200) further includes a managing system (210). In one example, the managing system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the managing system (204) includes a registering engine (214-1), an obtaining engine (214-2), a participant identifying engine (214-3), a generating engine (214-4), a permitting engine (214-5), a moderator identifying engine (214-6), and a receiving engine (214-7).

The registering engine (214-1) registers, via a UI, a number of users with the managing system (210), the managing system (210) permitting the number of users to create a list of participants in the calendar application (218) for a conference call. For example, the UI may include a number of drop down boxes. The drop down boxes allows the users to select user names acid/or email addresses. The UI may include a number of radio buttons. By selecting the radio buttons, the radio buttons allow the user to select a user names and/or email addresses. The UI may include a text box. The text box allows the users to manually define user names and/or email addresses. The UI may include a submit button. Once the user has specified the user names and/or email addresses, the user may select on the submit button. Once the submit button is selected, the personal passcode is sent to the user via the email system (208). The user may access the email system (208) to retrieve their personal passcode. In other examples the UI may display the personal passcode. As a result, the users are registered with the managing system (210) and receive their own personal passcode. The personal passcodes are associated with their corresponding email addresses which have been included in a calendar invitation for a conference call. As a result, users need not install teleconferencing programs.

Further, the registering engine (214-1) allows the users to reset their personal passcode. The registering engine (214-1) may allow the user to reset their personal passcode via the functions of the drop down boxes and radio buttons described above. As a result, if the user desires to reset their personal passcode, the managing system (210) allows them to do so.

The obtaining engine (214-2) obtains, via the calendar application (218), a list of participants, the list of participants includes a number of participants to be included in a conference call. In some examples the conference call may be an impromptu conference call. For an impromptu conference call the moderator calls the conference call number, enters his or her personal passcode and performs an action, such as pressing *3 on a keypad of a telephone device (216). This indicates that the conference call will be an impromptu conference call. The managing system (210) in turn generates a one-time use passcode that is audibly provided to the moderator. The moderator shares the one-time use passcode with the participants. As a result, the participants may enter in the one-time use passcode on a keypad of a telephone device (216) once the participants have dialed the conference call number to join the impromptu conference call.

Other technologies, such as paired moderator and participant passcodes, can also serve a purpose for impromptu meetings or for meetings for which security is not a concern. Each user may have a reusable participant passcode, also generated by the generating engine (214-4). Once the user has authenticated with his or her personal passcode, the user can indicate by performing an action, such as pressing *3 on a keypad of a telephone device (216), that the user would like to act as the moderator of an impromptu meeting for which his or her reusable participant passcode should be valid. Others may join this call by entering the moderator's reusable participant passcode rather than their own personal passcodes. Further, the moderator of a scheduled meeting can at any time active their participant passcode by performing an action, such as pressing *3 on a keypad of a telephone device (216). The participants already connected to the conference call would remain connected to the conference call, but other users may now join the conference call by entering the moderator's personal passcode or by entering their own personal passcode if they were already listed as a participant in for the conference call.

Additionally, individual or recurring conference call for which the moderator is unconcerned with security, the moderator may select a function in the calendar application (218) to enable the moderator's reusable participant passcode to be shared with the participants. As a result, any user may dial in to the conference call with the moderator's participant passcode and those invited to the meeting may use either the moderator's participant passcode or their own personal passcode. Selecting this option is an indicator that the moderator is comfortable with the present level of security of the system (200).

Further, the conference call may be an extended conference call. Conference call often runs longer than expected. The moderator can perform an action such as pressing *3 on a keypad of a telephone device (216) to extend the conference call. This extension will be indefinite until the moderator can perform another action such as pressing *5 on the keypad of the telephone device (216) to exit the conference call or hanging up the telephone device (216). Further, any of the participants who were listed as a participant in the list of participants in the extended call will be presented with joining the extended meeting as an option when connecting with their personal passcodes so long as the extension is still active.

The participant identifying engine (214-3) identifies, from the list of participants, a first portion of the participants that have personal passcodes. The personal passcodes is a unique passcode that is specific to each participant. Further, the personal passcodes are not selected by the participants, rather they are generated by the managing system (210). This increases the security of the personal passcode. Since the managing system (210) is in communication with the calendar application (218) and the database (212), the participant identifying engine (214-3) identifies, from the list of participants, a first portion of the participants. For example, for conference call A (222-1), the participant identifying engine (214-3) identities, from the calendar application (218), participant A (226-1) and participant B (226-2) are included in the list of participants. Further, the participant identifying engine (214-3) identifies, from the database (212) that participant A (226-1) has personal passcode A (232-1) and participant B (226-2) has personal passcode B (232-2).

Similarly, for conference call B (222-2), the participant identifying engine (214-3) identifies, from the calendar application (218), participant A (226-1) and participant D (226-4) are included in the list of participants. Further, the participant identifying engine (214-3) identifies, from the database (212) that participant A (226-1) has personal passcode A (232-1). However, participant D (226-4) does not have a personal passcode B.

The generating engine (214-4) generates guest passcodes for a second portion of the participants associated with the list of participants that do not have their own personal passcodes. In an example, the generating engine (214-4) identifies, from the list of participants, the second portion of participants that do not have the personal passcodes as guests. As mentioned above, participant D (226-4) does not have a personal passcode. As a result, participant D (226-4) may be a guest.

The generating engine (214-4) determines a guest passcode for each of the guests. As a result, the generating engine (214-4) determines a guest passcode for participant D (226-4).

Further, the generating engine (214-4) determines if each of the guests are a frequent guest or an infrequent guest. A frequent guest is commonly invited to attend conference call. As a result, it is beneficial to treat a frequent guest as a participant by providing them with a personal passcode that they can reuse just like those within the organization. The option of providing a guest with a personal passcode may be determined automatically by the generating engine (214-4). Alternatively, the option of providing a guest with a guest passcode or a personal passcode may be determined manually by a user such as the moderator. A table can be created for these external users, such as frequent guests, that would map their email address to their personal passcode.

Further, there may be other participants who are infrequent guests. For these participants the generating engine (214-4) generates a guest passcode that is specific to a particular conference call and only valid for the duration of that conference call. The moderator of the conference call can select a new calendar entry in the calendar application (218) to generate a onetime guest passcode for infrequent guest. The guest passcode can be shared with multiple guests and would not remain valid outside of the specific conference call.

Further, the generating engine (214-4) retrieves a corresponding email addresses for each of the frequent guests. The generating engine (214-4) retrieves a corresponding email addresses for each of the frequent guests via the mail system (208).

The generating engine (214-4) further stores, in a library, the guest passcode as a personal passcode for each of the frequent guests with the corresponding email address. Although not illustrated, the library may be similar to the database (212). In other examples the generating engine (214-4) further stores the personal passcode for each of the frequent guests with the corresponding email address in the database (212).

Further, the generating engine (214-4) sends the guest passcode to each of the guests. The guest passcode may be sent to the guests via an email sent to the email system (208), a short message service (SMS), the calendar application (218), or a telephone device (216).

The permitting engine (214-5) permits, based on the personal passcodes or the guest passcodes, each of the participants to participate in the conference call. To dial into a conference call, a participant would dial the conference call number and then supply their personal passcode or guest passcode. The managing system (210) contacts the calendar application (218) to determine which moderator's conference call they should attend. As a result, there's only one passcode to memorize which can be used for all of a participant's conference calls. Further, the moderator can precisely control who is attending each conference call. In some examples, the moderators, participants, and frequent guests can save their conference call number and personal passcodes as a contact entry of a telephone device (216).

The moderator identifying engine (214-6) identifies, based on the personal passcodes together with the calendar application (218), a moderator for the conference call. The user scheduling the conference call is the moderator unless otherwise specified. For example, a secretary can schedule a conference call for a vice president (VP) and specify that the VP is actually the moderator. Again, the moderator just dials the conference call number and then provides their personal passcode. The managing system (210) contacts the calendar application (218) to determine that the user has a scheduled conference call and their conference call begins. In some examples if the moderator has secluded two overlapping conference calls, the moderator is prompted to attend this conference call or a different conference call. As a result, there is no need to memorize multiple passcodes. Further, there is no need to share one's personal passcode or guest passcode at any point.

In some examples, the conference calls are more closely associated with a calendar entry in the calendar application (218) than with the moderator. Further, the managing system (210) uses the calendar entry to determine who is acting as the moderator. It is therefore possible that a conference call could conceivably begin or continue in the absence of a moderator. For example, a reoccurring conference call may be scheduled when the moderator is on vacation. Given that the calendar entries of the calendar application (218) can be individually moderated, the moderator could select a feature such that the conference call does not need the moderator to be present.

In another example, the moderator may designate an alternate moderator or a fill-in moderator. A fill-in moderator could perform some action such as pressing *4 on a keypad of a telephone device (216) to indicate his or her awareness that the moderator will not be joining and that the alternate moderator will be filling in.

If a moderator has teleconferencing software installed, the moderator can uniquely identify which participant is generating unwanted audio because each line is now paired with a specific user via their personal passcode. For example, noise detected from a line will be depicted by lines above a microphone icon. Therefore, allowing the moderator to either ask the specific participant to stop speaking and/or mute their line.

As mentioned above, the managing system (210) includes the receiving engine (214-7). The receiving engine (214-7) receives an action from at least one of the participants. The action may designate a fill-in moderator. It may be the case that the moderator wishes to join or moderate another conference call, but the discussion is valuable and the moderator doesn't wish to interrupt it, apart from announcing their exit. The moderator may designate a fill-in moderator on the fly. This can be performed through the calendar application (218) or a hand shake technique between the moderator and the fill-in moderator. A hand shake technique between the moderator and the fill-in moderator may include the moderator pressing *4 on a keypad of a telephone device and then the fill-in moderator pressing *4 on a keypad of a telephone device.

The action may extend the conference call. If the moderator of the extended conference call is also moderating another conference call just after then a participant who was listed as a participant for both would hear an audio prompt such as, press 1 to join Mr. X's meeting disclosure presentation which started at 1:30, press 2 to join Mr. X's meeting build procedures, which started at 2:30.

Further, the action allows the participants to switch between the conference call and a conflicting conference call. The managing system (210) doesn't automatically switch participants from conference call to conference call based on a schedule. The participant who is in one conference call will have to take action to switch to the next conference call, even in the absence of conflict. As a result, a participant would initiate the switch to the next conference call via an action such as a key sequence entered in on the keypad of the telephone device (216). If there are conflicts at the time the participant initiates the switch, that is addressed just as it would be when the participant initially dialed into the managing system (210) via the conference call number.

There may be ambiguity with regard to which conference call a participant should join when the participant dials into the conference call number with his or her personal passcode. This can happen when a conference call the participant was invited to or is moderating has extended into the next scheduled conference call or when there is more than one conference call at a particular time that the participant has accepted, tentatively accepted or is moderating. When such conflicts arise, the participant will be audibly prompted with conference call details such as meeting chair and/or summary for each scheduled conference call then asked to enter a number or a key sequence on the keypad of the telephone device (216) to join a respective conference call. For example, the prompt may be press 1 to join conference call X, press 2 to join conference call Y. Even in the absence of a conflict, the participant is still audibly informed which conference call they are joining.

Further, there can be an action that generates an uninvited passcode for an uninvited participant that is valid for the duration of the conference call. The uninvited participants may be last minute users who were not formally invited to participate in the conference call via the methods and techniques described above. For example, the moderator may need to add a participant at the last minute and doesn't want to have to go through the trouble of inviting the participant and waiting for the participant to accept the invite before the participant can join the conference call. This may even be impossible if the participant or moderator doesn't have internet access. The moderator can generate the one-time use uninvited passcode for such occasions. The uninvited passcode isn't specifically associated with a particular participant and the participant need not have done anything in terms of the calendar application (218) in order to be able to join the conference call. If the moderator lacks internet access, the moderator can initiate the handshake described above to designate a fill-in moderator. Because the calendar application (218) and managing system (210) are in communication, the calendar application (218) will be aware that the fill-in moderator is the acting as the moderator for this conference call and can do things like generates one-time use uninvited passcode for the conference call.

An overall example of FIG. 2 will now be described. The registering engine (214-1) registers, via a UI, a number of users with a managing system, the managing system permitting the number of users to create a list of participants in a calendar application for a conference call. The obtaining engine (214-2) obtains, via a calendar application (218), a list of participants to be included in conference call A (222-1) as participants. The participants may be participant A (226-1) and participant B (226-2). The participant identifying engine (214-3) identifies, from the list of participants, a first portion of the participants that have personal passcodes. The participant identifying engine (214-3) identifies personal passcode A (232-1) and personal passcode B (232-2). The generating engine (214-4) generates guest passcodes for a second portion of the participants associated with the list of participants that do not have the personal passcodes. Since all the participants have personal passcodes, the generating engine (214-4) does not generate any gust passcodes. The permitting engine (214-5) permits, based on the personal passcodes or the guest passcodes, each of the participants to participate in the conference call as described above. The moderator identifying engine (214-6) identifies, based on the personal passcodes, a moderator for the conference call. Based on the calendar entry, participant A (226-1) is identified as the moderator and participant A will be identified via their use of passcode A (232-1). The receiving engine (214-7) receives an action from at least one of the participants. Participant A (226-1) may enter an action on a keypad of telephone device A (216-1) to switch over to conference call B (222-2).

While this figure has been described with reference to conference call in an audio form, the conference call may be in other forms. For example, the conference call may be in an audio-video form. A conference call in the audio-video form may be initiated on devices that have displays, cameras, microphones, speakers, and can access to a uniform resource locator (URL). Each of the participants may access the URL and authenticate via their personal passcode or guest passcode to join the conference call. Once the participants join the conference call, the displays, cameras, microphones, and speakers may be used to facilitate communication.

Figure 3:
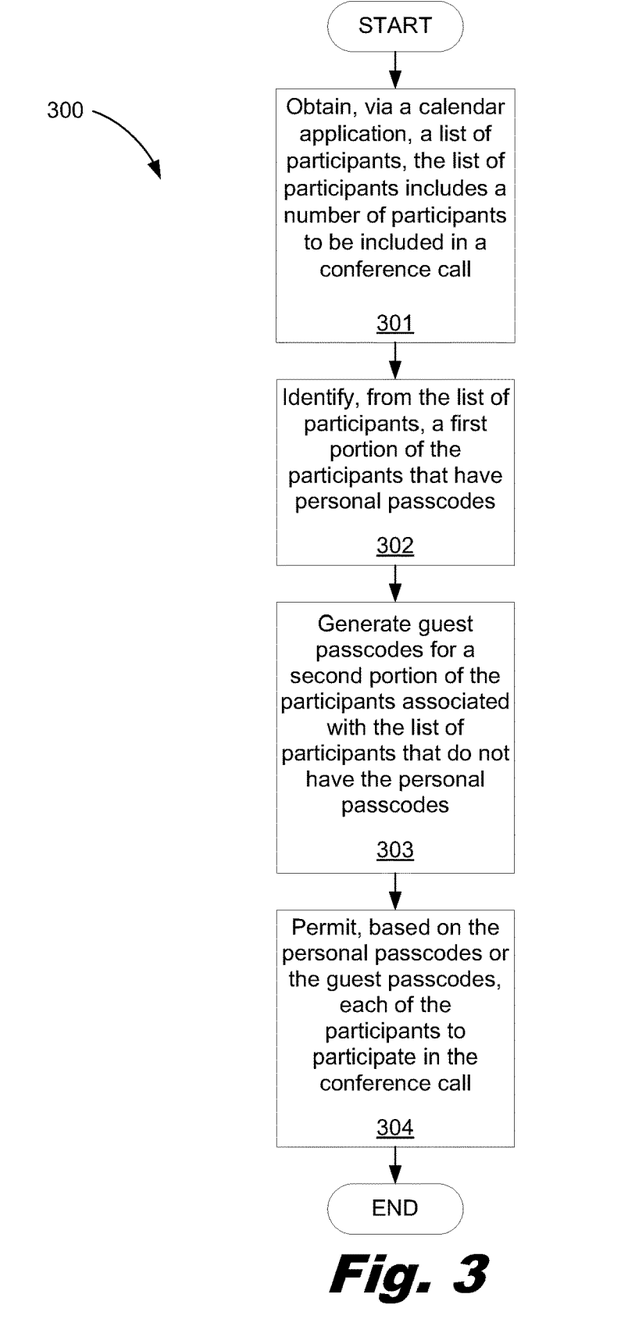
FIG. 3 is a flowchart of an example of a method for managing access to a conference call, according to one example of principles described herein.

FIG. 3 is a flowchart of an example of a method for managing access to a conference call, according to one example of principles described herein. The method (300) may be executed by the system (100) of FIG. 1. The method (300) may be executed by other systems such as system 200, system 500, or system 600. In this example, the method (300) includes obtaining (301), via a calendar application, a list of participants, the list of participants includes a number of participants to be included in a conference call, identifying (302), from the list of participants, a first portion of the participants that have personal passcodes, generating (303) guest passcodes for a second portion of the participants associated with the list of participants that do not have the personal passcodes, and permitting (304), based on the personal passcodes or the guest passcodes, each of the participants to participate in the conference call.

As mentioned above, the method (300) includes obtaining (301), via a calendar application, a list of participants, the list of participants includes a number of participants to be included in a conference call. The method (300) may obtain the list of participants from several calendar applications that are registered with the managing system. For example, if a system includes calendar system X, calendar system Y, and calendar system 7 the method (300) may accesses calendar system X, calendar system Y, and calendar system Z to obtain the list of participants.

As mentioned above, the method (300) includes identifying (302), from the list of participants, a first portion of the participants that have personal passcodes. The method may access a database as described above to identify the first portion of the participants that have the personal passcodes. The first portion of the participants may be identified via credentials such as user names or email addresses.

As mentioned above, the method (300) includes generating (303) guest passcodes for a second portion of the participants associated with the list of participants that do not have the personal passcodes. If the database cannot identify all participants via credentials such as user names or email addresses, these participants that cannot be identified are considered to be guests. As a result, the method (300) may generate the guess passcodes as described above for the guests.

As mentioned above, the method (300) includes permitting (304), based on the personal passcodes or the guest passcodes, each of the participants to participate in the conference call, if the personal passcodes or the guest passcodes is valid for the conference call, the participant may join the conference call. However, if the personal passcodes or the guest passcodes is not valid for the conference call, the participant may not join the conference call. Further, if a second user ties to access the conference call with a personal passcode of a first user who has already joined the conference call, the method (400) may not allow the second user to join the conference call. In some examples, the method (400) may prompt the first user to reset their personal passcode. Further, other actions may be taken by the method (400) if more than one user tries to access the conference call with one personal passcode.

Figure 4:
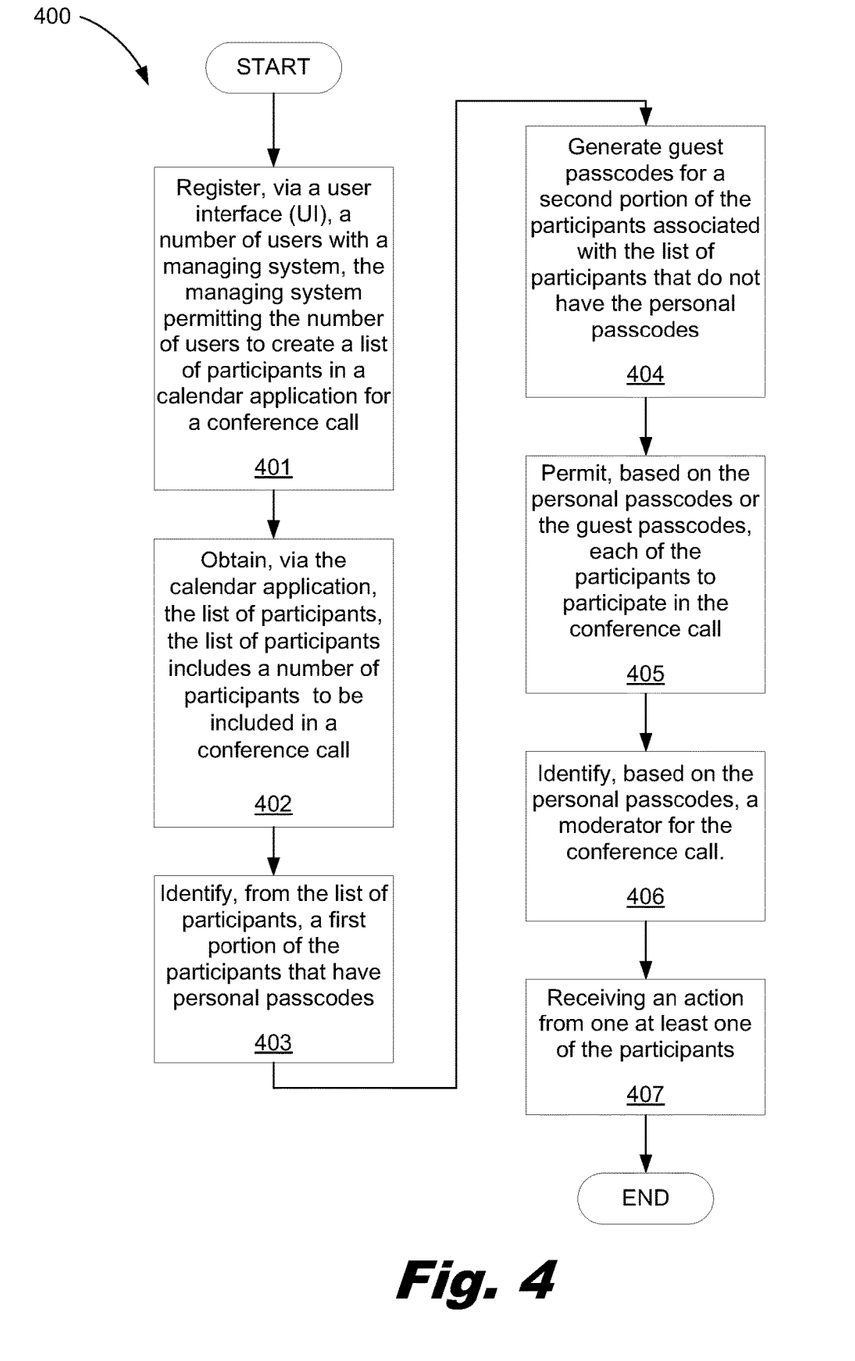
FIG. 4 is a flowchart of an example of a method for managing access to a conference call, according to one example of principles described herein.

FIG. 4 is a flowchart of an example of a method for managing access to a conference call, according to one example of principles described herein. The method (400) may be executed by the system (100) of FIG. 1. The method (400) may be executed by other systems such as system 200, system 500, or system 600. In this example, the method (400) includes registering (401), via a UI, a number of users with a managing system, the managing system permitting the number of users to create a list of participants in a calendar application for a conference call, obtaining (402), via a calendar application, the list of participants, the list of participants includes a number of participants to be included in the conference call, identifying (403), from the list of participants, a first portion of the participants that have personal passcodes, generating (404) guest passcodes for a second portion of the participants associated with the list of participants that do not have the personal passcodes, permitting (405), based on the personal passcodes or the guest passcodes, each of the participants to participate in the conference call, identifying (406), based on the personal passcodes, a moderator for the conference call, and receiving (407) an action from at least one of the participants.

As mentioned above, the method (400) includes registering (401), via a UI, a number of users with a managing system, the managing system permitting the number of users to create a list of participants in a calendar application for a conference call. The method (300) may present the UI to the number of user at time of registration. The method (300) may present the UI to the number of users each time the users accesses the managing system. The method (300) may present the UI to the number of users each time the users set up a conference call.

As mentioned above, the method (400) includes identifying (406), based on the personal passcodes, a moderator for the conference call. The method (400) may identify an original moderator for the conference call. The method (400) may allow the moderator to designate a fill-in moderator.

As mentioned above, the method (400) includes receiving (407) an action from at least one of the participants. The action extends the conference call, designates a fill-in moderator, allows the participants to switch between the conference call and a conflicting conference call, generates an uninvited passcode for uninvited participants that are valid for the duration of the call, or combinations thereof.

Figure 5:
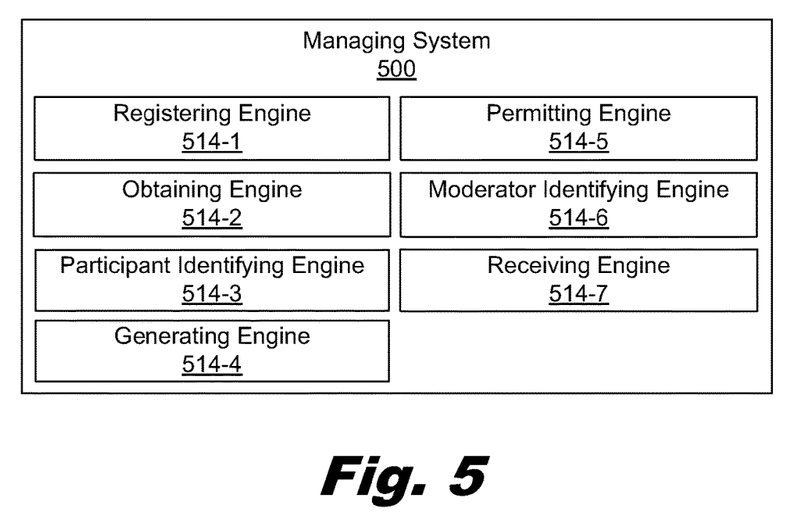
FIG. 5 is a diagram of an example of a managing system, according to the principles described herein.

FIG. 5 is a diagram of a managing system, according to one example of principles described herein. The managing system (500) includes a registering engine (514-1), an obtaining engine (514-2), a participant identifying engine (514-3), a generating engine (514-4), a permitting engine (514-5), a moderator identifying engine (514-6), and a receiving engine (514-7). The engines (514) refer to a combination of hardware and program instructions to perform a designated function. Alternatively, the engines (514) may be implemented in the form of electronic circuitry (e.g., hardware). Each of the engines (514) may include a processor and memory. Alternatively, one processor may execute the designated function of each of the engines (514). The program instructions are stored in the memory and cause the processor to execute the designated function of the engine.

The registering engine (514-1) registers, via a UI, a number of users with a managing system, the managing system permitting the number of users to create a list of participants in a calendar application for a conference call. The registering engine (514-1) registers, via the UI, the number of users with the managing system, the managing system permitting the number of users to create the list of participants in one calendar application for the conference call. The registering engine (514-1) registers, via the UI, the number of users with the managing system, the managing system permitting the number of users to create the list of participants in several calendar applications for several conference calls.

The obtaining engine (514-2) obtains, via the calendar application, the list of the participants, the list of participants includes a number of participants to be included in the conference call. The obtaining engine (514-2) obtains, via the calendar application, one list of participants to be included in the conference call as participants. The obtaining engine (514-2) obtains, via the calendar application, several lists of participants to be included in the conference call as participants.

The participant identifying engine (514-3) identifies, from the list of participants, a first portion of the participants that have personal passcodes. The participant identifying engine (514-3) identifies, from several lists of participants, the first portion of the participants that have personal passcodes.

The generating engine (514-4) generates guest passcodes for a second portion of the participants associated with the list of participants that do not have the personal passcodes. The generating engine (514-4) generates one guest passcode for a second portion of the participants associated with the list of participants that do not have the personal passcodes.

The permitting engine (514-5) permits, based on the personal passcodes or the guest passcodes, each of the participants to participate in the conference call. The permitting engine (514-5) permits, based on the personal passcodes or the guest passcodes, each of the participants to participate in the conference call as long as the personal passcodes and/or guest passcodes are valid.

The moderator identifying engine (514-6) identifies, based on the personal passcodes, a moderator for the conference call. The moderator identifying engine (514-6) identifies, based on the personal passcodes, one moderator for the conference call. The moderator identifying engine (514-6) identifies, based on the personal passcodes, several moderators for the conference call.

The receiving engine (514-7) receives an action from at least one of the participants. The receiving engine (514-7) receives several actions from several of the participants.

Figure 6:
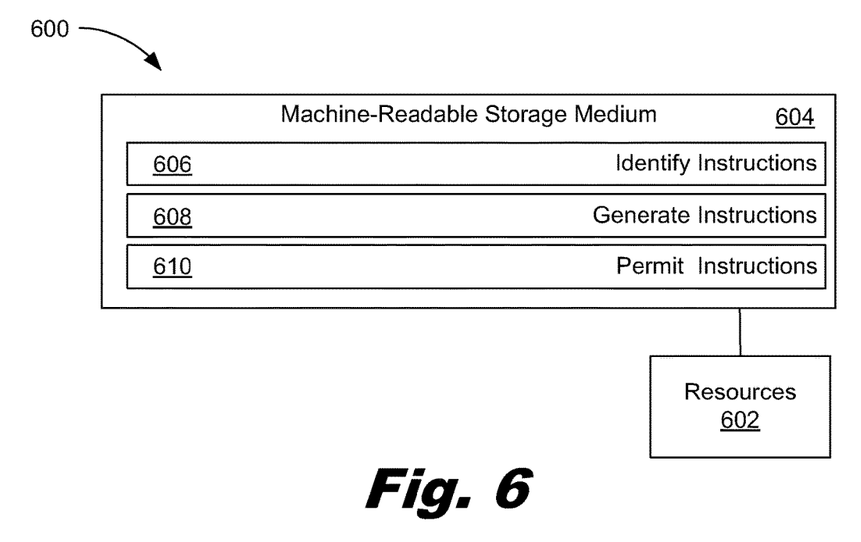
FIG. 6 is a diagram of an example of a managing system, according to the principles described herein.

FIG. 6 is a diagram of a managing system, according to one example of principles described herein. In this example, the managing system (600) includes resource(s) (602) that are in communication with a machine-readable storage medium (604). Resource(s) (602) may include one processor. In another example, the resource(s) (602) may further include at least one processor and other resources used to process instructions. The machine-readable storage medium (604) represents generally any memory capable of storing data such as instructions or data structures used by the managing system (600). The instructions shown stored in the machine-readable storage medium (604) include identify instructions (606), generate instructions (608), and permit instructions (610).

The machine-readable storage medium (604) contains computer readable program code to cause tasks to be executed by the resource(s) (602). The machine-readable storage medium (604) may be tangible and/or physical storage medium. The machine-readable storage medium (604) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The identify instructions (606) represents instructions that, when executed, cause the resource(s) (602) to identify, from a list of participants, a first portion of participants that have personal passcodes. The generate instructions (608) represents instructions that, when executed, cause the resource(s) (602) to generate guest passcodes for a second portion of the participants associated with the list of participants that do not have the personal passcodes. The permit instructions (610) represents instructions that, when executed, cause the resource(s) (602) to permit, based on the personal passcodes or the guest passcodes, each of the participants to participate in the conference call.

Further, the machine-readable storage medium (604) may be part of an installation package. In response to installing the installation package, the instructions of the machine-readable storage medium (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (602) and the machine-readable storage medium (604) are located within the same physical component, such as a server, or a network component. The machine-readable storage medium (604) may be part of the physical component's main memory, caches, registers, non-volatile memory, or elsewhere in the physical component's memory hierarchy. Alternatively, the machine-readable storage medium (604) may be in communication with the resource(s) (602) over a network. Further, the data structures, such as the libraries, may be accessed from a remote location aver a network connection while the programmed instructions are located locally. Thus, the managing system (600) may be implemented on a user device, on a server, on a collection of servers, or combinations thereof.

The managing system (600) of FIG. 6 may be part of a general purpose computer. However, in alternative examples, the managing system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for managing access to a conference call, the system comprising a computer implementing a managing system, the computer comprising a network interface and being programmed to:
   obtain, via a calendar application, a list of participants to be included in a conference call;
   identify, from the list of participants, a first portion of the participants that have personal passcodes and a second portion of the participants that do not have a personal passcode;
   generate a guest passcode for each of the participants that do not have a personal passcode; and
   permit each of the participants presenting either a personal passcode or a guest passcode to participate in the conference call;
   wherein each guest passcode is unique and generating the guest passcodes comprises:
   designating each of the participants that do not have a personal pass code as a frequent guest or an infrequent guest;
   retrieving a corresponding electronic mail (email) addresses for each of the frequent guests;

storing, in a library, the guest passcode as a personal passcode for each of the frequent guests along with the corresponding email address for that frequent guest.

2. The system of claim 1, the computer comprising a network interface further being programmed to identify, based on a passcode entered by a participant, to which of a plurality of conference calls the participant is to be joined.

3. The system of claim 1, the computer comprising a network interface further being programmed to enable an original moderator to transfer responsibility to a fill-in moderator.

4. The system of claim 1, the computer comprising a network interface further being programmed to, in response to receiving an action from at least one of the participants, generate an uninvited passcode for an uninvited participant that is valid for the duration of the conference call.

5. The system of claim 1, the computer comprising a network interface further being programmed to, in response to receiving an action from at least one of the participants, allow at least one of the participants to switch between the conference call and a conflicting conference call.

6. The system of claim 1, the computer comprising a network interface further being programmed to, when the conference call is an impromptu conference call:
receive indication of an action by a moderator to initiate an impromptu conference call;
generate a one-time use passcode that is provided to the moderator to be shared with desired participants to the impromptu conference call; and
connect participants to the impromptu conference call based on either entry of the one-time user passcode or a valid personal passcode known to the system.

7. The system of claim 1, the computer comprising a network interface further being programmed to reset a personal passcode at request of a corresponding participant.

8. The system of claim 1, wherein the guest passcode generated for an infrequent guest is a onetime guest passcode.

9. A method for managing access to a conference call with the system comprising a computer implementing a managing system, the computer comprising a network interface, the method comprising:
obtaining a list of participants to be included in the conference call;
identifying, from the list of participants, a first portion of the participants that have a personal passcode and a second portion of the participants that do not have a personal passcode;
generating a guest passcode for each participant that does not have a personal passcode;
in response to presentation of either a personal passcode or a guest passcode, permitting a participant to participate in the conference call, wherein each personal or guest passcode uniquely corresponds to a particular participant;
determining if each of the participants lacking a personal passcode is a frequent guest or an infrequent guest; and
adopting the guest passcode assigned to a frequent guest as a personal passcode for that participant.

10. The method of claim 9, further comprising identifying, based on the personal passcodes, a moderator for the conference call.

11. The method of claim 9, further comprising transferring responsibility from an original moderator to a fill-in moderator using a handshake procedure.

12. The method of claim 11, wherein the handshake procedure comprises the original moderator entering a code to the system and the fill-in moderator also entering a code to the system.

13. The method of claim 9, further comprising identifying, based on a passcode entered by a participant, to which of a plurality of conference calls the participant is to be joined.

14. The method of claim 9, further comprising, generating an uninvited passcode for an uninvited participant that is valid for the duration of the conference call.

15. The method of claim 14, wherein the uninvited passcodes is generated only in response to an action by an existing participant of a conference call.

16. The method of claim 9, further comprising, in response to receiving an action from at least one of the participants, allow at least one of the participants to switch between the conference call and a conflicting conference call.

17. The method of claim 9, further comprising, when the conference call is an impromptu conference call:
receiving indication of an action by a moderator to initiate an impromptu conference call;
generating a one-time use passcode that is provided to the moderator to be shared with desired participants to the impromptu conference call; and
connecting participants to the impromptu conference call based on either entry of the one-time user passcode or a valid personal passcode known to the system.

18. The method of claim 9, further comprising resetting a personal passcode at request of a corresponding participant.

19. The method of claim 9, further comprising generating a onetime guest passcode for an infrequent guest.

20. A computer programming product comprising a non-transitory machine-readable storage medium encoded with instructions for managing access to a conference call, the instructions executable by a processor of a system to cause the system to:
obtain, via a calendar application, a list of participants to be included in a conference call;
identify, from the list of participants, a first portion of the participants that have personal passcodes and a second portion of the participants that do not have a personal passcode;
generate a guest passcode for each of the participants that do not have a personal passcode; and
permit each of the participants presenting either a personal passcode or a guest passcode to participate in the conference call;
wherein each guest passcode is unique and generating the guest passcodes comprises:
designating each of the participants that do not have a personal pass code as a frequent guest or an infrequent guest;
retrieving a corresponding electronic mail (email) addresses for each of the frequent guests;
storing, in a library, the guest passcode as a personal passcode for each of the frequent guests along with the corresponding email address for that frequent guest.

* * * * *